United States Patent [19]

Nisley

[11] Patent Number: 5,028,151

[45] Date of Patent: Jul. 2, 1991

[54] BEARING ASSEMBLY

[75] Inventor: Donald L. Nisley, Greenville, S.C.

[73] Assignee: Reliance Electric Company, Greenville, S.C.

[21] Appl. No.: 452,255

[22] Filed: Dec. 18, 1989

Related U.S. Application Data

[63] Continuation of Ser. No. 226,143, Jul. 29, 1988, abandoned.

[51] Int. Cl.⁵ .............................................. F16C 25/08
[52] U.S. Cl. .................................... 384/477; 384/498; 384/300; 384/908; 384/624
[58] Field of Search ............... 384/477, 498, 300, 625, 384/908, 909, 492, 213, 145, 146, 624

[56] References Cited

U.S. PATENT DOCUMENTS 3,957,319  5/1976  Gorski ................................. 384/568
4,252,859  2/1981  Concannon et al. ................ 428/422
4,554,704  11/1985  Raffaeli ............................. 384/300

OTHER PUBLICATIONS

Teflon Industrial Coatings—DuPont.
Teflon/Silverstone Coatings Fact Sheet—DuPont.

Primary Examiner—Lenard A. Footland
Attorney, Agent, or Firm—Dority & Manning

[57] ABSTRACT

A bearing assembly suitable for use in a wet or harsh chemical environment including a support housing having a bore therein and a bearing insert received in said bore, exterior surfaces of said housing and interior surfaces defining said bore having tough, durable coatings of fluorocarbon polymer to render same resistant to corrosive chemical attack during usage in the good and chemical industry and the method of making the same, and to permit said bearing insert to self-seat in said bore.

10 Claims, 3 Drawing Sheets

BEARING ASSEMBLY

This is a continuation of application Ser. No. 226,143, filed July 29, 1988 now abandoned.

BACKGROUND OF THE INVENTION

This invention relates to a bearing assembly for use in environs in which particular attention must be given to cleanliness and/or where resistance to oxidation is paramount, such as in the food or chemical industry. More specifically, this invention relates to a bearing assembly having a cast iron housing coated in part with a low friction, chemically resistant polymer coating.

In the food, chemical and environmental industries there is a great need for a bearing assembly which resists rust, and will not chip, flake or deteriorate in severe wet operating environments or under high pressure washdowns. It is also important, in such environments, that the housing not be subject to corrosion from chemicals normally encountered during use. In the past, cast iron housings of such bearing assemblies have been nickel plated to render the housing resistant to the chemical and environmental demands. In one example, where a ball bearing insert is to swivel into a spherical bore of a ball bearing housing, the housing bore dimensions are controlled to give a specified swivel torque. This procedure is used for a standard line of ball bearings.

When nickel plating is applied to such a ball bearing housing, the spherical bore must be machined oversize to allow for the plating buildup, and requires an additional set up over standard machining operations. Furthermore, due to variations in plating thickness, ball bearing inserts to be used with the plated housings must be graded by size and a trial and error assembly procedure has to be employed to achieve a desired swivel torque with the assembly.

Various and sundry products have heretofore been coated with fluorocarbon polymers such as a polytetrafluorotheylene, or products themselves have been made of such products, particularly to take advantage of low friction characteristics of the polymer. It is also believed, though not known, that bearing inserts may have been produced before and coated with fluorocarbon polymers.

Bearing assemblies according to the present invention represent improvement over the prior art. Particularly, bearing assemblies according to the present invention are fully protected from the environment, are more uniform, and operate at desired assembly torque levels. Moreover, with assemblies according to the present invention, trial and error matching of housings and inserts is no longer necessary.

SUMMARY OF THE INVENTION

It is an object of the present invention to provide an improved bearing assembly which is coated with a fluorocarbon polymer which avoids problems previously encountered with nickel plated cast iron bearing assembly housings.

It is another object of the present invention to provide a fluorocarbon polymer coated cast iron bearing assembly which is resistant to corrosive effects of chemicals and the like.

It is another object of the present invention to provide a food bearing assembly which can be utilized at a predictable swivel torque level.

The above objects are realized by providing a thin coating of a fluorocarbon polymer on the outer surfaces of a cast iron housing of a bearing assembly which is to be exposed to chemical action in food processing or in chemical industries, and the like. The polymer coating is preferably applied by a process which permits the thickness of the coating to be closely controlled, and with which standard ball bearing housings and inserts can be employed without special grading to different sizes and trial and error matching.

More particularly, preferably a first fluorocarbon polymer is applied to the entire surfaces of the housing, and a second fluorocarbon polymer is applied to the outer surface, while a dummy bearing insert is placed in the bore opening within the housing to prevent deposition of the second polymer therein. An actual bearing insert received within the bore opening will then self seat therein and will exhibit a generally uniform swivel torque thereabout.

BRIEF DESCRIPTION OF THE DRAWINGS

The invention will now be described in conjunction with the attached drawings in which.

DETAILED DESCRIPTION OF THE DRAWINGS

Figure 1:
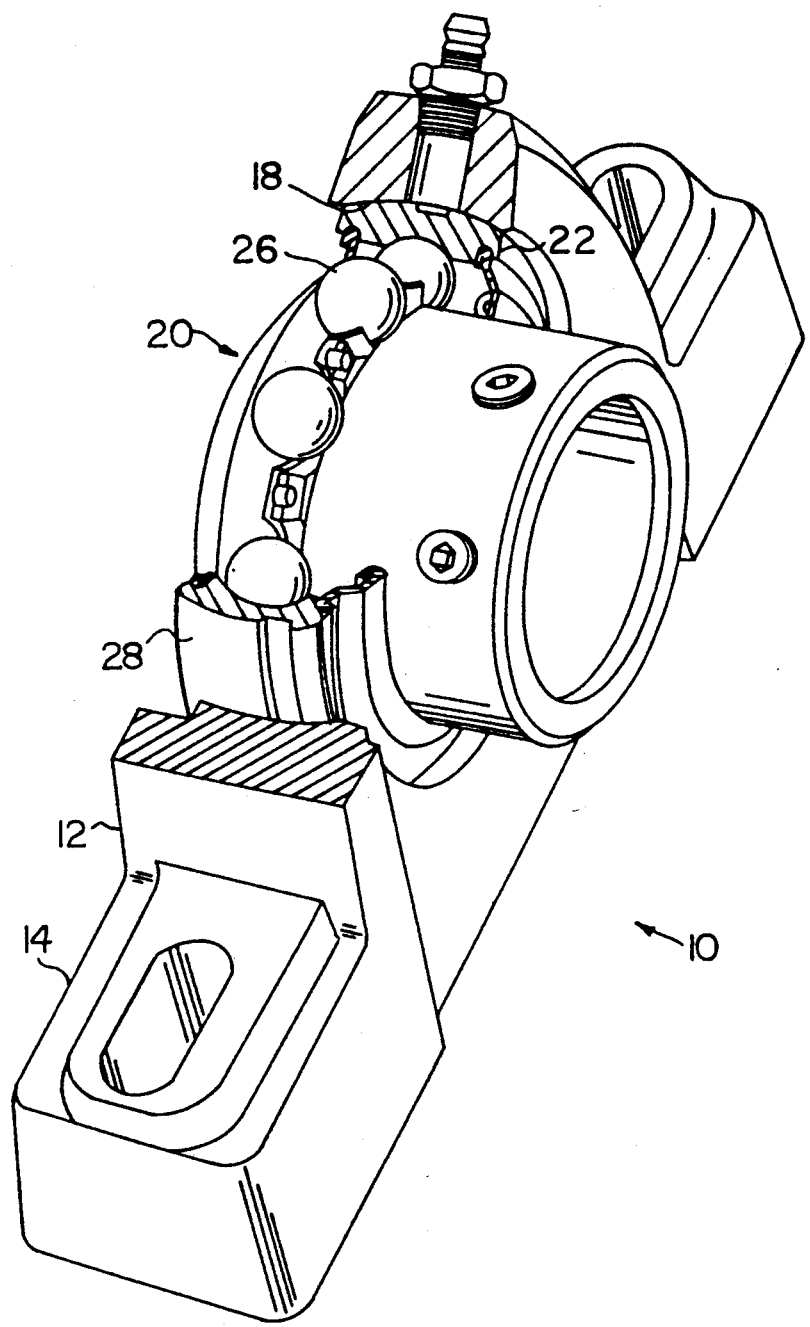
FIG. 1 is a perspective view partially in section of a bearing assembly.
Figure 2:
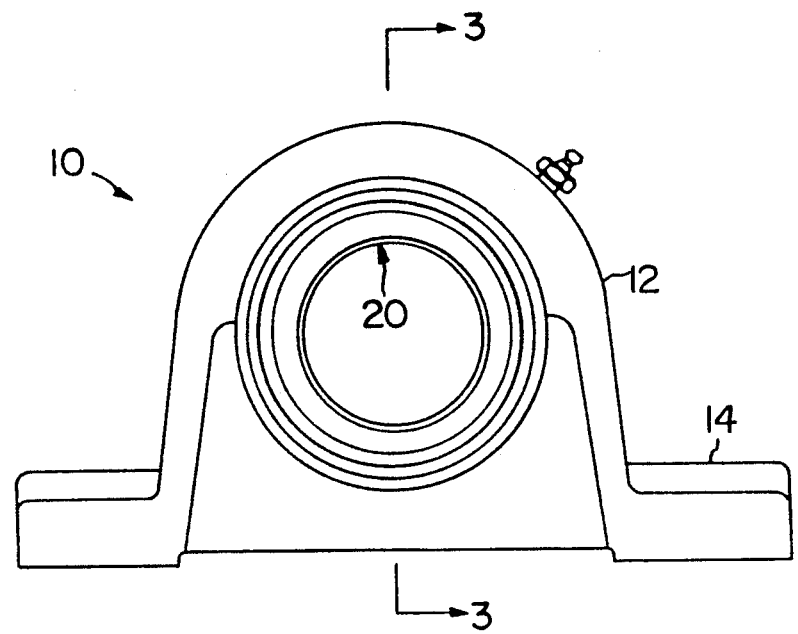
FIG. 2 is a front view of the bearing assembly with the bearing insert in the insertion position.
Figure 3:
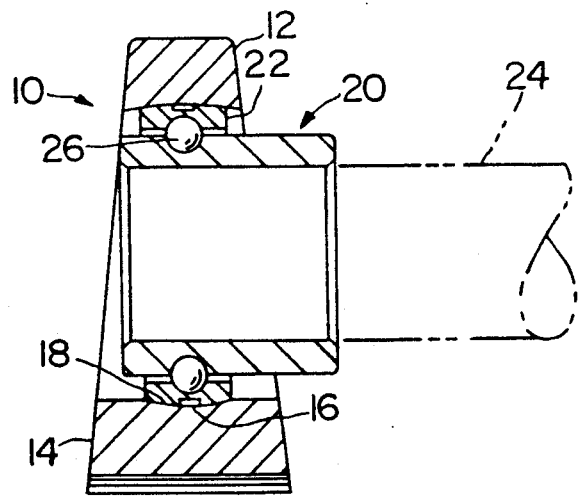
FIG. 3 is a sectional view taken along lines 3—3 of FIG. 2 with the bearing insert in the insertion position.
Figure 4:
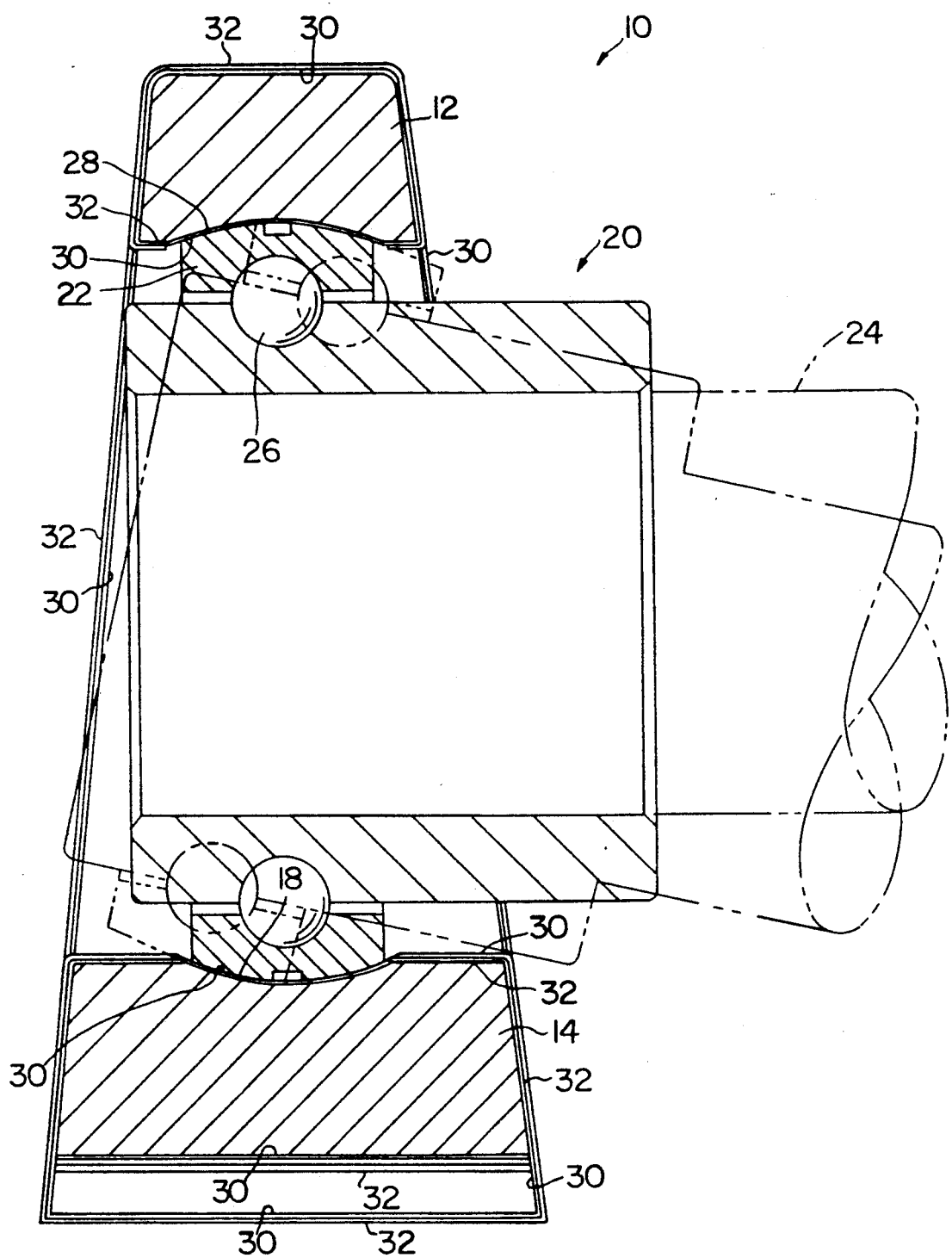
FIG. 4 is a view similar to FIG. 3, but showing displacement of the bearing insert in section to illustrate the bearing support for the shaft.

Referring now to FIGS. 1, 2 and 3, preferred embodiments of the present invention will be described. Bearing assembly generally 10 includes a housing 12 which includes a base 14 having means thereon (not shown) for attachment of the assembly to a supporting surface. Housing 12 further includes a spherical bore 16 therethrough and with curved inner surfaces 18 which, in effect, are concave surfaces with respect to the outer dimensions of bore 16. A bearing insert generally 20 is provided and includes a ball 22 and ball bearings, roller bearings or the like 26. Ball 22 of insert 20 is receivable within bore 16 where the peripheral, generally spherical surfaces 28 of same engage concave surfaces 18. A shaft 24 secured to and extending outwardly from the ball 22 may be supported by the bearings 26. The application of a given swivel torque to the shaft 24 moves the insert 20 a predetermined amount about the bore 16.

Housing 12 is manufactured of cast iron which is chemically cleaned before the exterior surfaces of same are provided with a protective coating of a fluorocarbon polymer. The protective coating is resistant to chemical attack, to corrosion, is unaffected by normal operating temperatures and has low friction characteristics. Before the coating is applied to the housing 12, however, an insert is placed within bore 16 to mask the curved inner surface 18. A "dummy" duplicate of the ball 22 is preferred and is inserted into bore 16, after which the entire unit is shot blasted. The insertion of the dummy into the bore 16 ensures that curved surface 18 of bore 16 is unaffected by the shot blasting and therefore remain smooth. The dummy insert is thereafter removed from the bore 16 before the polymer coating is applied.

The preferred polymer coating for housing 12 includes a first or primer coating 30 and a top coating 32. Primer polymer coating 30 for the housing 12 is preferably a fluorinated ethylene-propylene polymer, which affords a heavy-duty, non-stick surface for receipt of ball 22 of insert 20. Whereas the prior art assemblies required trial and error matching of bearing inserts and housings, such is not required for the bearing assemblies according to the present invention. Instead, the pliant nature of primer coating 30 permits receipt of virtually all of a given size ball even though normal tolerances may exist. At the same time, there is a generally same swivel torque experienced with all of the assemblies of the present invention. The primer coating 30 is not only chemically inert and unaffected by harsh environs, but is also generally receptive of ball 22 of a bearing insert in a much improved fashion than the prior art structures. The fluorinated ethylene-propylene polymer primer coat is generally produced by copolymerization of tetrafluoroethylene and hexafluoropropylene and predominantly is made up of linear chains of

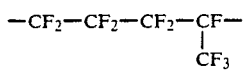

The fluorinated ethylene—propylene polymer may be provided in any suitable form for application to the bearing housing of the present invention. (In a most preferred application, as noted above, a spray coat is applied and the polymer further includes a phenolic binder and exhibits Hermeset characteristics.) Suitable commercial polymers include TEFLON 959-200 series resin manufactured by DuPont Company, Wilimington, Del. and FEP resins of LNP Engineering Plastics, Malvern, Pa.

Curved surfaces 18 within bore 16 of housing 12, as noted above have historically been nickel plated, and so plated have encountered the restrictions and problems noted above. According to the present invention, the entire housing 12 (including the bore 16) is first provided with a primer polymer coating 30 having a thickness of from about 0.3 mil to about 0.5 mil. The primer coating should be heat resistant to 425° F. (218° C.) on a continuous bases, and up to 450° F. (232° C.) on an intermittent basis, without any appreciable loss of physical properties. The abrasion resistance as tested with a Bell Abrasion Tester should be between 30 to 50 gms/mil. An abrasion resistance sliding arm test with a 500 gm load at 1000 cycles (#400 Emery Paper with 5.5 sq. in. surface) produced a 9.3 mg. weight loss.

After the primer coating 30 is applied to the housing 12, the dummy duplicate of the insert 20 is reinserted into the bore 16. A top coating 32 is then applied to the housing 12, the top coating 32 effectively covering the entire surface of the housing except curved inner surface 18.

A preferred polymer for the top coating 32 of the surface of housing 12 is a perfluoralkoxy polymer which is a Hermoplastic polymer. Perfluoralkoxy polymers contain repeat units of

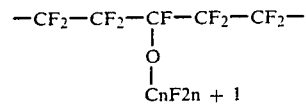

Again, as with the fluorinated ethylene—propylene polymer, various ingredients may be added to the perfluoralkoxy polymer to render same suitable for a particular coating technique. A preferred polymer that is used in spray coating is TEFLON P 532-700 manufactured by DuPont Company. Top coating 32 is preferably applied by a spray coating process to achieve a uniform coating thickness of up to 4.0 mils and preferably between about 1 and about 3 mils. The top coating should be heat resistant to 500° F. (260° C.) on a continuous basis and up to 550° F. (288° C.) on an intermittent basis. The top coating kinetic coefficient of friction against polished steel is 0.1. The water absorbtion of the top coating is limited to a maximum of 0.03%.

The primer coating 30 should have a combination of low friction characteristics and surface elastic characteristics which allows the bearing insert 20 to seat itself in the housing's spherical bore 16 without destroying the corrosion resistant coating. The polymer coating has non-stick surface characteristics that nickel plating does not have which also is very important in the food and chemical industry for washdown and contamination avoidance, and offers greater resistance to corrosive and chemical attack.

While particular preferred polymers have been described, it should be noted that any form of fluorocarbon polymer which may be suitably applied to cast iron and which has non-sticking, chemically resistant characteristics, can be employed to coat the exterior and interior surfaces of the bearing housing for the purposes of this invention.

Furthermore, it should be noted that the form of the housing disclosed herein is given only by example, and is not deemed to be limiting on the invention. Obviously, any type of bearing housing that is going to be exposed to the corrosive effect of food and chemical attack, will benefit from the polymer coating considered herein. It is obvious that many changes may be made herein without deviating from the scope of the claims appended hereto.

What is claimed is:

1. A bearing assembly suitable for use in a harsh environment comprising:
    a) a bearing housing defining a bore therethrough, said bore having a curved inner surface therearound for receiving a bearing insert;
    b) a thin pliant coating of at least 0.3 mil of a first fluorocarbon polymer which exhibits thermoset characteristics received on an outer surface of said housing and on said curved inner surface of said bore, said polymer coating becoming affixed to said surfaces of said bearing housing and having a low porosity, low friction characteristics, exhibiting resistance to corrosion and chemical attack, and having adequate elasticity to receive a properly sized bearing insert within normal manufacturing tolerances within said bore with a generally uniform resulting swivel torque;
    c) a spherical bearing insert received within said spherical bore in contact with said first polymer coating; and d) a coating of up to 4.0 mils of a second fluorocarbon polymer on exposed surfaces of said housing when said bearing insert is in place, said second polymer exhibiting thermoplastic characteristics, having a low porosity, low friction characteristics and exhibiting resistance to corrosion and chemical attack.

2. A bearing assembly as set forth in claim 1, wherein ball bearings are disposed within an inner bore of said bearing insert for supporting the shaft.

3. A bearing assembly as set forth in claim 1, wherein roller bearings are disposed within the inner bore of said bearing insert for supporting a shaft.

4. A bearing assembly as set forth in claim 1, wherein bushings are disposed within the inner bore of said bearing insert for supporting a shaft.

5. A bearing assembly as defined in claim 1 wherein the first fluorocarbon polymer is a fluorinated ethylene—propylene polymer.

6. A bearing assembly as defined in claim 1 wherein said first polymer has a thickness in a range of from about 0.3 to about 0.5 mils.

7. A bearing assembly as defined in claim 6 where the first polymer covers the exterior and interior surfaces of the bearing housing and is a primer coating for the second polymer.

8. A bearing assembly as defined in claim 7 wherein the second polymer has a thickness of up to 4.0 mils.

9. A bearing assembly as defined in claim 8 wherein said second polymer has a thickness of from about 1.0 to about 3.0 mils.

10. A bearing assembly as defined in claim 1 wherein the second fluorocarbon polymer is a perfluoroalkoxy polymer.

* * * * *